United States Patent Office 3,541,002
Patented Nov. 17, 1970

---

3,541,002
PARTICULATE CATALYST REGENERATION METHOD
Lester M. Rapp, Hightstown, N.J., assignor to Cities Service Research and Development Company, New York, N.Y., a corporation of Delaware
Filed Dec. 29, 1967, Ser. No. 694,561
Int. Cl. B01j *11/02*
U.S. Cl. 208—143               6 Claims

ABSTRACT OF THE DISCLOSURE

This invention is for a method of semi-continuously withdrawing, regenerating, and replacing particulate catalyst in a continuously operating high pressure hydrogenation treatment process, particularly a process utilizing an expanded or ebullated catalyst bed. The invention comprises intermittently withdrawing spent particulate catalyst from the ebullated bed, washing and stripping the withdrawn catalyst, accumulating the stripped catalyst particles in a first regeneration zone, and regenerating the accumulated catalyst in the first regeneration zone while simultaneously accumulating stripped catalyst particles in a second regeneration zone. Regenerated particulate catalyst is semi-continuously fed to the hydrogenation zone from the first regeneration zone as required to maintain the level of the operating catalyst bed, while accumulated catalyst in the second regeneration zone is regenerated and the process repeated.

BACKGROUND OF THE INVENTION

This invention relates to a method for the semi-continuous regeneration of particulate catalyst in processes involving the treatment of hydrocarbon oils in the presence of catalyst.

More particularly this invention is applicable to processes for the treatment of petroleum oils by contacting the oils with hydrogen in the presence of particulate catalysts. The use of catalysts in the treatment of petroleum oils is well known in the art. Likewise an extensive technology has been developed to permit continuous catalytic treatment of streams of hydrocarbon oil in order to achieve economy of operation. To achieve continuous catalytic treatment of oils, catalyst which has become deactivated during the course of the treatment must be removed and replaced with fresh catalyst. Several different processes have therefore been developed to accomplish such an object. These are generally described as either fixed-bed, moving-bed or fluid-bed processes. In the fixed-bed processes a series of catalytic treatment reactors are employed, one or more being onstream and catalytically treating the hydrocarbon oil while the others are either being cleaned, or the catalyst being replaced or regenerated in place. Examples of fixed-bed processes are Houdry and Cycloversion catalytic cracking, platinum catalyst reforming and the original hydroforming installations.

In moving-bed catalyst systems regenerated catalyst in the form of beads or pellets are lifted by air, and flow downward by gravity through the catalytic treatment zone and then through a regeneration zone where air continuously burns coke from the catalyst.

Fluid-bed processes utilize a finely powdered catalyst which is suspended by various fluids throughout the process in the reaction and regeneration zones, the powdered catalyst being held in a suspended state by the passage of gases through the catalyst while small amounts of catalyst are fluid transported from the reactor to the regenerator and then back to the reaction zone.

Obviously either fluid-bed or moving-bed processes are not suited for catalytic treatment processes utilizing a relatively large size catalyst particle, where the treatment is at high pressures and the catalyst particles require low pressure washing and stripping prior to regeneration. Fixed-bed processes are inherently undesirable because a number of reactors are required in order to keep one always onstream, as well as the fact that operations with each of the reactors are complicated by the different treatments which are required for each reactor.

A recently disclosed process for the catalytic treatment of petroleum oils with hydrogen, which utilizes an expanded or ebullated bed, including regeneration means is described in U.S. Pat. No. Re. 25,770 issued Apr. 27, 1965 to E. S. Johanson for a Gas-liquid Contacting Process. Johanson indicates therein that particulate catalyst material may be continuously withdrawn from the treatment zone as a slurry and passed to the regenerator, where the catalyst particles are separated from the slurry, regenerated, reslurried, and returned to the treatment zone. However, certain problems resulting from the need of continuously removing a minor proportion of spent catalyst particles from the high pressure treatment zone, and of concurrently replenishing the treatment zone with regenerated and/or fresh catalyst are encountered. Regeneration of the spent catalyst particles cannot be accomplished on a continual basis, and accordingly presents the problem of providing a continual supply of regenerated catalyst particles to the treatment zone.

SUMMARY OF THE INVENTION

Accordingly I have invented a process for the catalytic treatment of petroleum and hydrocarbon oils wherein particulate catalyst is semi-continuously regenerated and returned to the treatment zone, particularly a hydrogenation treatment zone. The process comprises withdrawing spent particulate catalyst from the treatment zone, washing and stripping the catalyst of absorbed hydrocarbon fluids, accumulating the stripped dry catalyst in a first regeneration zone and regenerating the stripped particulate catalyst in the first regeneration zone, while simultaneously accumulating dry particulate catalyst in a second regeneration zone. Regenerated catalyst is then fed to the treatment zone as desired.

It is therefore an object of this invention to provide a novel and improved process for catalytically treating petroleum and hydrocarbon oils.

Another object of this invention is to provide a process for the semi-continuous withdrawal, regeneration, and replenishment of particulate catalyst in a catalytic treatment zone.

Still another object of this invention is for an improved catalytic hydrogenation process embodying semi-continuous particulate catalyst withdrawal, regeneration, and replenishment.

Other objects and advantages of the process according to this invention will be apparent to those skilled in the art from the description of the drawing and specific embodiment which follows.

BRIEF DESCRIPTION OF THE DRAWING

The drawing shows the hydrogenation treatment and associated catalyst withdrawal process of this invention in a schematic flow diagram.

DESCRIPTION OF THE PREFERRED EMBODIMENTS

Referring now to the drawing wherein a pair of reactor vessels, 12 and 14 respectively for catalytically treating petroleum and hydrocarbon oils with hydrogen, are shown. The reactor vessels 12 and 14 are capable of operating at the high pressure (e.g. 1,000 to 5,000 p.s.i.g.) and high temperatures, i.e. above 400° F. which are nor-

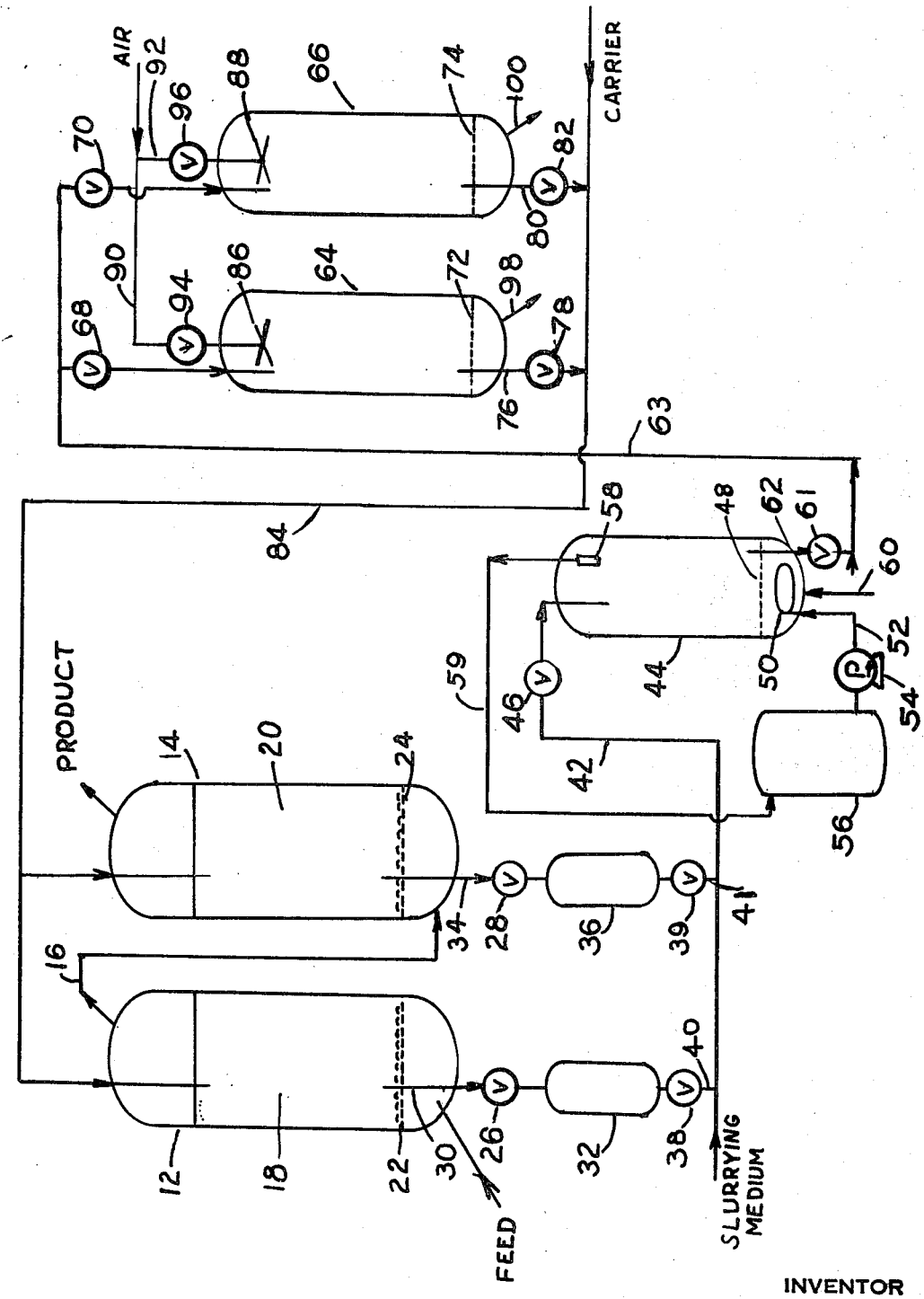

erence numbers 72 and 74 respectively. The grids 72 and 74 allow gases and liquids to pass therethrough while retaining the mass of particulate catalyst. A regenerated catalyst removal conduit 76 extends into the lower portion above the grid 72 in regeneration vessel 64 and is provided with a valve 78. Similarly another regenerated catalyst removal conduit 80 extends into regeneration vessel 66 and is provided with a valve 82 for controlling removal of regenerated catalyst. The two removal conduits 76 and 80 are communicatingly connected to a regenerated catalyst feed line 84 through which light oil or an inert gas from a source not shown is passed to act as a carrier medium for the regenerated catalyst. The regenerated catalyst feed line 84 connects through valves, not shown, to each of the reactor vessels 12 and 14.

A pair of gas distributors, 86 and 88 respectively, are located in the upper part of each of the regeneration vessels 64 and 66, and are connected by suitable piping 90 and 92, and valves 94 and 96, respectively, to a source, not shown, of regeneration gases preferably air and inert gases such as superheated steam. Finally combustion gas removal conduits 98 and 100, respectively, are communicatingly connected to the bottom of each of regeneration vessels 64 and 66 and provide for removal of gases evolved during the regeneration of the dry particulate catalyst.

In operation, a spent particulate catalyst and liquid reactant mixture is withdrawn about once a day from each of the operating high pressure reactor vessels 12 and 14. About 0.01 to 1.0 lbs. catalyst per bbl. feed is removed each day and passed into each of the withdrawal pots 32 and 36.

After termination of the withdrawal from the reactor vessels, the withdrawn particulate catalyst is passed as a slurry in a light oil medium to the washing and stripping vessel 44. Wash oil is first recirculated through the washing and stripping vessel for a period sufficient to remove substantially all the heavy and residual oil adsorbed on the particulate catalyst. After washing, hydrogen gas is passed upwardly through the washing and stripping vessel 44 for at least one hour to remove any light or wash oil remaining on the catalyst. The upward flow rates of both the wash oil and the hydrogen drying gas are at velocities which expand the mass of particulate catalyst and impose a random motion to the catalyst particles as hereinbefore described. A liquid velocity of 2–100 gal./min./ft.$^2$ is sufficient.

The dry stripped particulate catalyst is then passed to the first regeneration vessel 64 via an inert gas carrying medium and accumulated in the regeneration vessel 64 until a full charge of spent particulate catalyst is accumulated. This may amount to about seven days accumulation of withdrawn spent catalyst from the reactor vessels. However also contemplated as part of the process of this invention, is the patrial charging of the regeneration vessel 64 with a portion of fresh newly produced particulate catalyst, so that the accumulated dry particulate catalyst may be composed of both fresh and spent catalyst particles. The inclusion of fresh catalyst particles with the spent catalyst provides an economic and advantageous break-in treatment for the fresh catalyst.

The regenerative treatment for a particular hydrogenation catalyst, specifically a cobalt-molybdenum catalyst Aero HDS–3A manufactured by American Cyanamid Co. of Bound Brook, N.J. is as follows. After the regeneration vessel has been fully charged with hot dry particulate catalyst, steam at a pressure of about 100 p.s.i.g. and a temperature of 600° F. mixed with air, is introduced into the regeneration vessel 64 through gas distributor 86. The steam rate is about 1 lb. of steam per hour per pound of catalyst, while air is present in a concentration equivalent to about 0.5 mol percent oxygen. After coke burnoff is initiated, temperature of the flame front in the regeneration zone is maintained at as close to 750° F. as possible. (An increase of approximately 0.1 mol percent oxygen results in a 25° F. temperature rise above inlet temperature.) Coke burnoff is completed by bringing the flame front temperature to about 800° F. if possible. After coke burn off is completed as indicated by a lowering temperature, the steam flow is terminated. Air flow is continued to cool the burned-off particulate catalyst mass to about 350° F. and the reactor vessel 64 is then purged with nitrogen. If desired the regenerated particulate catalyst may be sulfided by adjusting the reactor vessel pressure to about 250 p.s.i.g. with recycled hydrogen gas containing hydrogen sulfide at a temperature of about 400° F. until a copious breakthrough of hydrogen sulfide is observed. The regenerated particulate catalyst is stored in the regeneration vessel 64 and fed to thereactor vessels 12 and 14 periodically, to maintain the catalyst beds 18 and 20 respectively at the desired levels.

After a full charge of dry particulate catalyst has been accumulated in the first regeneration vessel 64, accumulation of dry particulate catalyst is commenced in the second regeneration vessel 66, and the regeneration process described above in reference to the first regeneration vessel 64, is repeated utilizing the second regeneration vessel 66. Periodic withdrawal of spent particulate catalyst and continual periodic replenishment of the reactor vessels with regenerated particulate catalyst allows alternate use of the first and second regeneration vessels, 64 and 66, to provide a semi-continuous catalyst regeneration process according to this invention.

While the invention has been described above in connection with certain preferred embodiments, it will be understood by those skilled in the art that it is intended to cover those changes which may be made without departing from the spirit or scope of the invention.

I claim:
1. In a process for the catalytic treatment of hydrocarbon oils wherein particulate catalyst is semi-continuously regenerated and returned to a treatment zone the improvement comprising:
    (a) withdrawing spent particulate catalyst from the treatment zone;
    (b) washing the withdrawn spent particulate catalyst by passing a wash oil at a sufficient velocity upwardly through the particulate catalyst to expand the volume and induce random movement of the particulate catalyst;
    (c) stripping fluids from the washed particulate catalyst to obtain a dry particulate catalyst;
    (d) accumulating the dry particulate catalyst in a first regeneration zone; and
    (e) regenerating the dry particulate catalyst in the first regeneration zone while simultaneously accumulating dry particulate catalyst in a second regeneration zone.

2. The process of claim 3 wherein the withdrawn spent particulate catalyst is depressurized prior to washing the withdrawn catalyst.

3. In a process for the catalytic hydrogenation of hydrogenation of hydrocarbon oils wherein particulate catalyst is semi-continuously regenerated and returned to a hydrogenation zone, the improvement comprising withdrawing spent particulate catalyst from the hydrogenation zone, washing the withdrawn particulate catalyst by passing a wash oil at a sufficient velocity upwardly through the particulate catalyst to expand the volume and induce random movement of the particulate catalyst, stripping fluids from the washed particulate catalyst to obtain a dry particulate catalyst, accumulating the dry particulate catalyst in a first regeneration zone, and regenerating the dry particulate catalyst in the first regeneration zone, while simultaneously accumulating dried particulate catalyst in a second regeneration zone.

4. The process of claim 3 wherein the washed particulate catalyst is stripped of hydrocarbon fluids by passing hydrogen gas upwardly through the particulate catalyst at a sufficient velocity to expand and induce rondom movement of the catalyst mass.

5. The process of claim 4 which additionally comprises feeding regenerated particulate catalyst to the hydrogenation zone from the first regeneration zone, while simultaneously accumulating spent dry particulate catalyst in the second regeneration zone, and subsequently regenerating the accumulated dry particulate catalyst in the second regeneration zone.

6. The process of claim 5 wherein regenerated catalyst is fed to the hydrogenation zone from the first regeneration zone until the supply of regenerated catalyst in the first regeneration zone is exhausted, whereupon regenerated catalyst from the second regeneration zone is fed to the hydrogenation zone while spent dry particulate catalyst is again accumulated in the first regeneration zone.

References Cited

UNITED STATES PATENTS

| | | | |
|---|---|---|---|
| 2,414,736 | 1/1947 | Gray | 252—412 |
| 2,987,487 | 6/1961 | Stevens et al. | 252—417 |
| 3,108,972 | 10/1963 | Retailliau | 252—412 |
| 3,123,547 | 3/1964 | Palmer et al. | 208—164 |
| 3,151,060 | 9/1964 | Garbo | 208—143 |
| 3,379,638 | 4/1968 | Bloomer et al. | 208—131 |

HERBERT LEVINE, Primary Examiner

U.S. Cl. X.R.

208—157; 252—413